(12) United States Patent
Slabaugh et al.

(10) Patent No.: US 7,711,148 B2
(45) Date of Patent: May 4, 2010

(54) SYSTEMS AND METHODS FOR GUIDEWIRE TRACKING USING PHASE CONGRUENCY

(75) Inventors: Gregory G. Slabaugh, Princeton, NJ (US); Koon Yin Kong, Atlanta, GA (US); Gozde Unal, West Windsor, NJ (US); Tong Fang, Morganville, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 820 days.

(21) Appl. No.: 11/566,363

(22) Filed: Dec. 4, 2006

(65) Prior Publication Data

US 2007/0189580 A1   Aug. 16, 2007

Related U.S. Application Data

(60) Provisional application No. 60/742,993, filed on Dec. 7, 2005.

(51) Int. Cl.
*G06K 9/00* (2006.01)
*H05G 1/64* (2006.01)

(52) U.S. Cl. .................. 382/103; 382/128; 378/98.3

(58) Field of Classification Search ................. 382/100, 382/103, 128, 129, 130, 131, 132, 133, 134, 382/154, 168, 181, 193–203, 209, 232, 243, 382/255, 274, 276, 286–291, 305, 312; 702/66; 434/262; 623/3.1; 600/424, 41; 378/98.3; 604/95.05
See application file for complete search history.

(56) References Cited

U.S. PATENT DOCUMENTS

| | | | | |
|---|---|---|---|---|
| 6,895,077 | B2 * | 5/2005 | Karellas et al. | 378/98.3 |
| 6,939,138 | B2 * | 9/2005 | Chosack et al. | 434/262 |
| 7,108,696 | B2 * | 9/2006 | Daniel et al. | 606/41 |
| 7,280,863 | B2 * | 10/2007 | Shachar | 600/424 |
| 7,311,731 | B2 * | 12/2007 | Lesniak et al. | 623/3.1 |
| 7,371,067 | B2 * | 5/2008 | Anderson et al. | 434/262 |
| 7,402,151 | B2 * | 7/2008 | Rosenman et al. | 604/95.05 |
| 7,640,121 | B2 * | 12/2009 | Anderson | 702/66 |

* cited by examiner

*Primary Examiner*—Seyed Azarian

(57) ABSTRACT

A method of tracking a guidewire in video imagery includes: obtaining a first video image including pixels associated with features of a guidewire; selecting a set of parameters to define an open curve on the first video image; determining a feature map of the first video image using phase congruency; and updating the parameters of the open curve using the feature map to align the open curve to the pixels associated with the features of the guidewire.

20 Claims, 3 Drawing Sheets

SYSTEMS AND METHODS FOR GUIDEWIRE TRACKING USING PHASE CONGRUENCY

CROSS-REFERENCE TO RELATED PATENT APPLICATION

This application claims the benefit of U.S. Provisional Application Ser. No. 60/742,993, filed Dec. 7, 2005 and entitled "A Variational Approach to Guidewire Tracking Using Phase Congruency," the content of which is herein incorporated by reference in its entirety.

BACKGROUND OF THE INVENTION

1. Technical Field

The present disclosure relates to image processing and, more particularly, to guidewire tracking using phase congruency.

2. Discussion of Related Art

Endovascular interventions are becoming increasingly more common in the treatment of arterial disease like atherosclerosis. In such procedures, a guidewire is placed in the femoral artery in the groin and advanced towards the heart. Central to this process is accurate placement of the guidewire with respect to the vascular anatomy, which can be imaged using X-ray fluoroscopy. However, placement is often difficult due to the complexity of the vasculature, patient motion and, in the case of X-ray video, the low signal-to-noise ratio of the video that is a result of trying to minimize the patient radiation exposure.

Tracking a guidewire to a targeted site has many applications, such as for example, endovascular procedures. During an endovascular procedure, it would be beneficial to adaptively enhance the image around the guidewire location to reduce the noise and increase the guidewire conspicuity. Such enhancements would require an accurate determination of the image pixels that represent the guidewire.

SUMMARY OF THE INVENTION

According to an exemplary embodiment of the present invention, a method is provided for tracking a guidewire in video imagery. The method includes: obtaining a first video image including pixels associated with features of a guidewire; selecting a set of parameters to define an open curve on the first video image; determining a feature map of the first video image using phase congruency; and updating the parameters of the open curve using the feature map to align the open curve to the pixels associated with the features of the guidewire.

In a method for tracking a guidewire in video imagery, according to an exemplary embodiment of the present invention, when it is determined that convergence has occurred, and when there is a second video image to process, feature maps may be cross-correlated to find the displacement of the open curve. When there is a second video image to process, the open curve position in the second video image may be set using the displacement.

According to an exemplary embodiment of the present invention, a system for tracking a guidewire in video imagery comprises: a memory device for storing a program; a processor in communication with the memory device, the processor operative with the program to: obtain a first video image including pixels associated with features of a guidewire; select a set of parameters to define an open curve on the first video image; determine a feature map of the first video image using phase congruency; and update the parameters of the open curve using the feature map to align the open curve to the pixels associated with the features of the guidewire.

When it is determined that convergence has occurred, and when there is a second video image to process, the processor may be further operative with the program to cross-correlate feature maps to find the displacement of the open curve. When there is a second video image to process, the processor may be further operative with the program to set an open curve position in the second video image using the displacement.

According to an exemplary embodiment of the present invention, a method is provided for tracking a guidewire in video imagery. The method includes: obtaining a first video image including features of a guidewire; selecting a set of control points for defining a spline on the first video image; determining a feature map of the first video image using phase congruency; determining a gradient of the feature map, determining an arc length of the spline; determining curvature, blending coefficients, tangents and normals at a plurality of points on the spline; determining a system of linear equations using the curvature, blending coefficients, tangents and normals; inverting the system of linear equations to obtain the differential motion of the control points; and evolving the control points.

BRIEF DESCRIPTION OF THE DRAWINGS

The present invention will become more apparent to those of ordinary skill in the art when descriptions of exemplary embodiments thereof are read with reference to the accompanying drawings.

DESCRIPTION OF EXEMPLARY EMBODIMENTS

Figure 1:
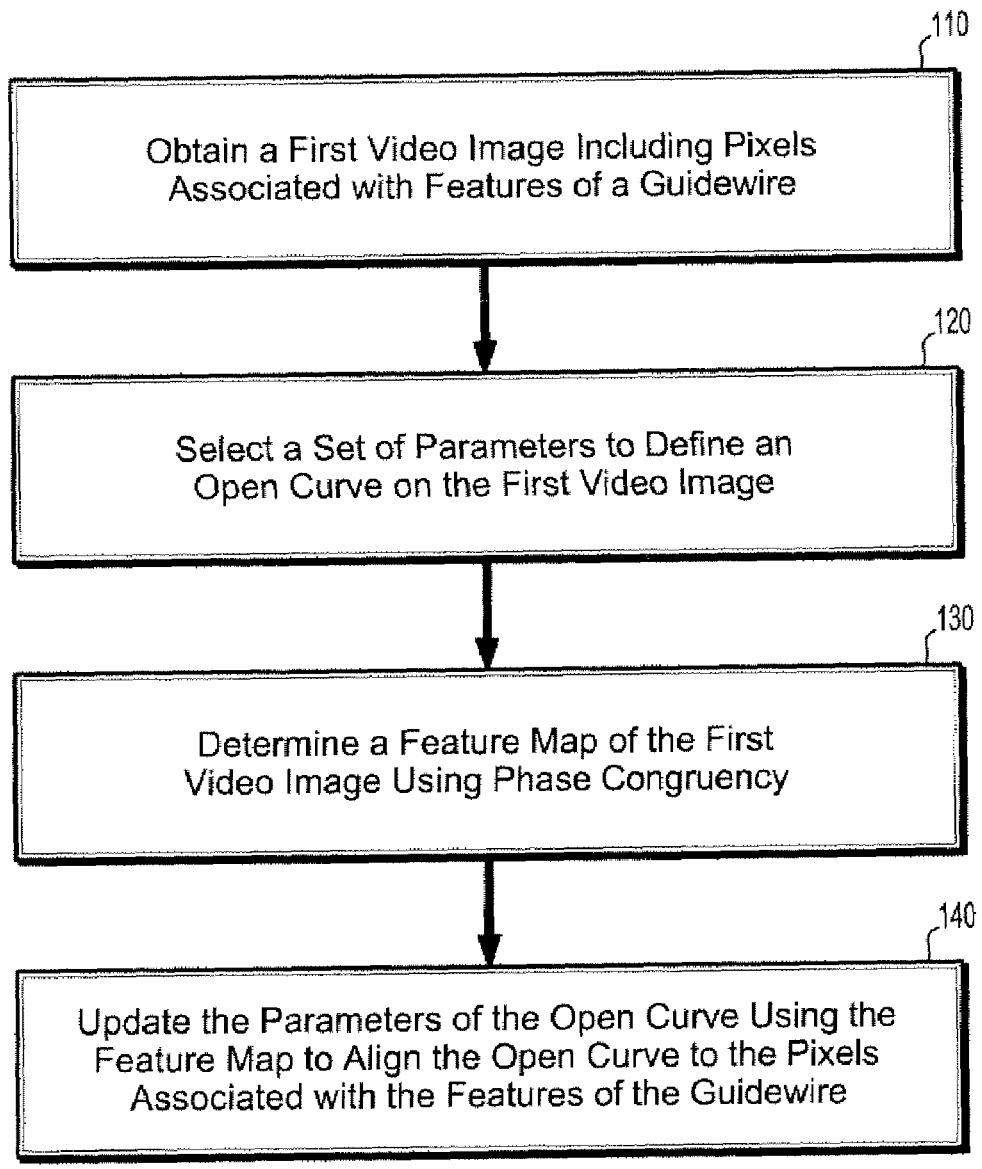
FIG. 1 is a flowchart showing a method of tracking a guidewire in video imagery, according to an exemplary embodiment of the present invention.

Hereinafter, exemplary embodiments of the present invention will be described in detail with reference to the accompanying drawings.

A guidewire may be modeled as an open contour, such as a spline. In an exemplary embodiment of the present invention, a method of tracking a guidewire in video imagery uses phase congruency as an image-based feature to which the spline is fitted. For example, the video may be cardiac and/or vascular X-ray video. The X-ray video may have poor, or low, contrast.

A method of tracking a guidewire in video imagery, according to an exemplary embodiment of the present invention, evolves control points of the spline subject to forces that force the spline to align to the guidewire pixels detected using phase congruency, remain smooth, and preserve an a priori length. A method of tracking a guidewire in video imagery may use variational calculus and deform the spline subject to image-based and intrinsic forces that require the spline to fit the image data, be smooth, and have an a priori length.

A method of tracking a guidewire in video imagery may use a framework in which partial differential equations are derived that perform gradient descent on an energy functional. Other numerical schemes that may be used to optimize the control point locations include coordinate descent, conjugate gradient descent, Newton's method, and the Levenberg-Marquardt algorithm.

Hereinafter, methods for deriving the evolution of the spline using variational calculus, according to exemplary embodiments of the present invention, will be described with reference to Equations 1-18.

The guidewire can be represented as an open curve, as given by Equation 1, in the image plane.

$$C = [x(s), y(s)]^T \quad (1)$$

According to exemplary embodiments of the present invention, the curve is modeled as a spline using control points $P_i$, $i=1 \ldots N$, where N is the number of control points.

The energy E of the curve may be defined in the following terms: E(C)=data+smoothness+length constraint. The data term will require that the spline pass through the features detected from the image. The smoothness term will require that the curve to be smooth. The length constraint term penalizes the curve's length from deviating from a known length. These energies can be scaled by constant weight factors, $w_1$, $w_2$, and $w_3$, respectively. The energy of the curve can be expressed as Equation 2.

$$E(C) = w_1 \int_C F ds + w_2 \int_C ds + w_3 \left( \int_C ds - L_0 \right)^2, \quad (2)$$

where F(x,y) is a feature map computed from the image, and $L_0$ is the a priori length of the curve.

X-ray videos typically have reduced contrast as a result of minimizing patient exposure to radiation. Traditional edge detection methods, such as those that rely on the gradient, may produce a weak response under such conditions. An edge detection method based on phase congruency according to an exemplary embodiment of the present invention may produce a stronger response even when the image contrast is low. In an exemplary embodiment of the present invention, the feature map F(x,y) is a function of the phase congruency edge detection image.

The partial derivative of E(C) may be taken with respect to an independent parameter t to obtain a curve evolution that minimizes the energy. Starting with the second term in Equation 2, the derivation can be given by:

$$\frac{\partial}{\partial t} w_2 \int_C ds = w_2 \frac{\partial}{\partial t} \int_0^1 \|C_p\| dp \quad (3)$$

$$= w_2 \int_0^1 <C_p, C_p>^{\frac{1}{2}} dp$$

$$= w_2 \int_0^1 \frac{<C_{pt}, C_p>}{\|C_p\|} dp$$

$$= w_2 \int_0^1 <C_{pt}, T> dp$$

$$= w_2 \int_0^1 <C_t, T> \Big|_{p=0}^1 - w_2 \int_0^L <C_t, \kappa N> ds$$

where <,> denotes an inner product operator, N is the curve normal, T is the curve tangent, and $\kappa$ is the curvature.

A curve evolution that minimizes the energy of the second term, according to an exemplary embodiment of the present invention, is given by Equation 4.

$$\frac{\partial C}{\partial t} = w_2 \kappa N + w_2 \delta(p) T - w_2 \delta(p-1) T \quad (4)$$

For the first term in Equation 2, the derivation can be given by:

$$\frac{\partial}{\partial t} w_1 \int_C F ds = w_1 \int_0^1 \frac{\partial}{\partial t} F \|C_p\| dp \quad (5)$$

$$= w_1 \int_0^1 \left( F \frac{\partial}{\partial t} <C_p, C_p>^{\frac{1}{2}} + \frac{\partial F}{\partial t} \|C_p\| \right) dp$$

$$= w_1 \int_0^1 (F <C_{pt}, T> + <\nabla F, C_t> \|C_p\|) dp$$

$$= w_1 \int_0^1 F <C_{pt}, T> dp + w_1 \int_0^L <\nabla F, C_t> ds$$

$$= w_1 \int_0^1 F <C_t, T> \Big|_{p=0}^1 - w_1 \int_0^L F <C_t, \kappa N> ds +$$
$$\quad w_1 \int_0^L <\nabla F, C_t> ds$$

A curve evolution that minimizes the energy for the first term of Equation 2, according to an exemplary embodiment of the present invention, is given by Equation 6.

$$\frac{\partial C}{\partial t} = w_1 F \kappa N - w_1 \nabla F + w_1 \delta(p) FT - w_1 \delta(p-1) FT \quad (6)$$

For the last term in Equation 2, the derivation can be given by $$\frac{\partial}{\partial t} w_3 \left( \int_C ds - L_0 \right)^2 = 2 w_3 \left( \int_C ds - L_0 \right) \frac{\partial}{\partial t} \int_C ds \quad (7)$$

Using the result from Equations 3 and 4, this gives the curve evolution that minimizes the energy for the last term in Equation 2 as $$\frac{\partial C}{\partial t} = 2 w_3 \left( \int_C ds - L_0 \right) (\kappa N + \delta(p) T - \delta(p-1) T) \quad (8)$$

Combining Equations 4, 6, and 8 yields a partial differential equation that minimizes Equation 2. This gives the curve evolution $$\frac{\partial C}{\partial t} = -w_1 \nabla F + \kappa \left( w_2 + w_1 F + 2 w_3 \left( \int_C ds - L_0 \right) \right) N + \quad (9)$$

$$\left[ \delta(p) \left( w_2 + w_1 F + 2 w_3 \left( \int_C ds - L_0 \right) \right) - \right.$$

$$\left. \delta(p-1) \left( -w_2 - w_1 F - 2 w_3 \left( \int_C ds - L_0 \right) \right) \right] T$$

Equation 9, which is herein referred to as the curve update equation, is independent of the representation of the open curve.

According to an exemplary embodiment of the present invention, the curve geometry is modeled using a spline that does not pass through the control points. For example, the curve may be represented using a uniform rational B-spline. Using a uniform rational B-spline, the curve is represented by M segments that interpolate the N=M+3 control points. In this example, the j th segment is a weighted combination of 4 control points, as given by Equation 12.

$$C_j(s) = \sum_{j}^{j+3} B_j(s) P_j, \qquad (12)$$

where j=1 ... M, s=ϵ[0,1]. The parametrization variable s is used to sample $B_j$, which are third order blending functions, and which can be given as Equation 13.

$$\frac{1}{6}[-s^3+3s^2-3s+1, 3s^3-6s^2+4, -3s^3+3s^2+3s+1, s^3]^T \qquad (13)$$

Inversion of Equation 12 expresses $P_j$ as a function of $C_j(s)$, and subsequent differentiation yields a differential relationship describing how the motion of the curve segment affects the control points. The inversion requires that the curve is sampled N times, where N is the number of control points, to obtain a determined system of equations. The number of samples may be much larger than N, resulting in an overdetermined system of equations.

For example, in the case when there are M=2 segments, corresponding to N=5 control points, and each of the segments is sampled L=2 times, the system of equations can be written as $$\begin{bmatrix} C_1(s_1) \\ C_1(s_2) \\ C_1(s_3) \\ C_1(s_4) \\ C_2(s_1) \\ C_2(s_2) \\ C_2(s_3) \\ C_2(s_4) \end{bmatrix} = \begin{bmatrix} a(s_1) & b(s_1) & c(s_1) & d(s_1) & 0 \\ a(s_2) & b(s_2) & c(s_2) & d(s_2) & 0 \\ a(s_3) & b(s_3) & c(s_3) & d(s_3) & 0 \\ a(s_4) & b(s_4) & c(s_4) & d(s_4) & 0 \\ 0 & a(s_1) & b(s_1) & c(s_1) & d(s_1) \\ 0 & a(s_2) & b(s_2) & c(s_2) & d(s_2) \\ 0 & a(s_3) & b(s_3) & c(s_3) & d(s_3) \\ 0 & a(s_4) & b(s_4) & c(s_4) & d(s_4) \end{bmatrix} \begin{bmatrix} P_1 \\ P_2 \\ P_3 \\ P_4 \\ P_5 \end{bmatrix} \qquad (14)$$

where $a=-s^3+3s^2-3s+1$, $b=3s^3-6s^2+4$, $c=-3s^3+3s^2+3s+1$, and $d=s^3$ are the elements in the blending function. More generally, this system of equations takes the form $$\begin{bmatrix} C_1(s_1) \\ C_1(s_2) \\ \vdots \\ C_1(s_L) \\ C_2(s_1) \\ C_2(s_2) \\ \vdots \\ C_2(s_L) \\ \vdots \\ C_M(s_1) \\ C_M(s_2) \\ \vdots \\ C_M(s_L) \end{bmatrix} = \begin{bmatrix} a(s_1) & b(s_1) & c(s_1) & d(s_1) & 0 & \cdots & 0 \\ a(s_2) & b(s_2) & c(s_2) & d(s_2) & 0 & \cdots & 0 \\ \vdots & & & & 0 & \cdots & 0 \\ a(s_L) & b(s_L) & c(s_L) & d(s_L) & 0 & \cdots & 0 \\ 0 & a(s_1) & b(s_1) & c(s_1) & d(s_1) & & \cdots \\ 0 & a(s_2) & b(s_2) & c(s_2) & d(s_2) & & \cdots \\ 0 & \vdots & & & & 0 & \cdots \\ 0 & a(s_L) & b(s_L) & c(s_L) & d(s_L) & & \cdots \\ \vdots & \vdots & \vdots & \vdots & \vdots & \vdots & \vdots \\ 0 & \cdots & 0 & a(s_1) & b(s_1) & c(s_1) & d(s_1) \\ 0 & \cdots & 0 & a(s_2) & b(s_2) & c(s_2) & d(s_2) \\ \vdots & \cdots & 0 & \vdots & & & \\ 0 & \cdots & 0 & a(s_L) & b(s_L) & c(s_L) & d(s_L) \end{bmatrix} \begin{bmatrix} P_1 \\ P_2 \\ \vdots \\ P_N \end{bmatrix} \qquad (15)$$

or equivalently, C=BP, where C is a ML×2 matrix, B is a ML×N matrix, and P is an N×2 matrix.

In an exemplary embodiment of the present invention, the curve can be sampled arbitrarily as long as there are at least N samples of the curve. Using the pseudo-inverse of B, this general system of equations can be inverted as shown in Equation 16.

$$P=(B^TB)^{-1}B^TC \qquad (16)$$

Differentiating Equation 16 results in the differential relationship between the movement of the control points relative to the movement of the curve, $$\frac{\partial P}{\partial t} = (B^TB)^{-1}B^T\frac{\partial C}{\partial t} \qquad (17)$$

In an exemplary embodiment of the present invention, the evolution of the control points is derived by plugging Equation 9 into Equation 17, which yields Equation 18.

$$\frac{\partial P}{\partial t} = (B^TB)^{-1}B^T \qquad (18)$$

$$\left\{-w_1 B^T \nabla F + k\left(w_2 + w_1 F + 2w_3\left(\int_C ds - L_0\right)\right)N + \right.$$

$$\left. w_1 F + 2w_3\left(\int_C ds - L_0\right) + (p-1)\left(-w_2 - w_1 F - 2w_3\left(\int_C ds - L_0\right)\right)T\right\}$$

Exemplary embodiments of the present invention may be embodied using a subset of the terms in Equation 18. For example, in an exemplary embodiment of the present invention, all terms in Equation 18 are used except the tangential ones.

FIG. 1 is a flowchart showing a method of tracking a guidewire in video imagery, according to an exemplary embodiment of the present invention. The video imagery may be X-ray video imagery. Referring to FIG. 1, in step 110, obtain a first video image including pixels associated with features of a guidewire. For example, images may be obtained from an X-ray fluoroscopy exam, where a patient is positioned in the X-ray machine and a video is taken while the doctor inserts the catheter through the vasculature. It is to be understood that the first video image may be obtained using various imaging modalities, such as for example, conventional photography, X-ray fluoroscopy, computed tomography (CT), ultrasound, magnetic resonance (MR), positron emission tomography (PET) and/or single photon emission computed tomography (SPECT). The first video image may be obtained using an input device, such as for example, a scanner. The first video image may be obtained from a computer readable medium. Each pixel in the first video image corresponds to a small volume element.

In step 120, select a set of parameters to define an open curve on the first video image. For example, the open curve may be represented by a uniform rational B-spline. Exemplary embodiments of the present invention may be embodied using various splines, polyline, fourier descriptor curves, or implicit curves to model the curve.

The parameters defining the open curve may be control points that are interpolated by the uniform rational B-spline. The parameters defining the open curve may be selected manually, for example, based on proximity to the guidewire. A user interface including, for example, a display, a keyboard and/or a pointing device, may be employed by the user to select the parameters defining the open curve. The parameters defining the open curve may be selected automatically.

In step 130, determine a feature map of the first video image using phase congruency. In general, finding where phase congruency is a maximum is roughly equivalent to finding where the weighted variance of local phase angles, relative to the weighted average local phase, is a minimum. Points of maximum phase congruency can be calculated by searching for peaks in the local energy function. That is, when the local energy function is directly proportional to the phase congruency function, peaks in the local energy will correspond to peaks in phase congruency. The use of phase congruency for feature detection may provide invariance to variations in image illumination and/or contrast.

In an exemplary embodiment of the present invention, determining a feature map of the first video image using phase congruency includes multi-scale image analysis. Multi-scale analysis considers features at multiple scales (sizes) in an image. For example, multi-scale image analysis may be performed using filter kernels that act on different spatial frequencies of the image.

In step 140, update the parameters of the open curve using the feature map to align the open curve to the pixels associated with the features of the guidewire. In an exemplary embodiment of the present invention, the update step 140 is performed by solving Equation 18, which is a system of partial differential equations. Equation 18 includes the feature map F, to which the open curve deforms so that it aligns with the guidewire detected in the feature map.

When aligning the open curve to the pixels associated with the features of the guidewire, according to an exemplary embodiment of the present invention, a predetermined length of the open curve is preserved. This predetermined length may be determined by the length of open curve defined by the initial set of control points. The predetermined length of the open curve may be determined by the length of the guidewire.

Updating the parameters defining the open curve may include energy minimization. In an exemplary embodiment of the present invention, updating the parameters defining the open curve includes using a gradient descent process that minimizes an energy functional defined on the spline. Tangential forces may be used to update the parameters defining the open curve. A pseudo-inverse may be used to update the parameters defining the open curve.

A method of tracking a guidewire in video imagery according to an exemplary embodiment of the present invention described in connection with FIG. 1 may include determining whether convergence has occurred. As used herein, the term "convergence" refers to the point at which a local minimum of an energy has been reached. For example, convergence refers to the point at which the energy E(C) in Equation 2 reaches a local minimum. Upon convergence, according to an exemplary embodiment of the present invention, the open curve has reached its optimal position. Upon convergence, Equation 18 is solved.

When convergence has occurred, and when there is another video frame to process, a cross-correlation of feature maps may be determined to find displacement of the open curve. For example, this may be achieved by forming a bounding box around the open curve on the current frame. The pixels of the current frame in the bounding box form a sub-image that is cross-correlated with the next video frame. It is to be understood that the next video frame may be the second video image, third video image, fourth video image, or other video image. In an exemplary embodiment of the present invention, the peak of the cross-correlation may give the displacement of the open curve on the next video frame.

A method of tracking a guidewire in video imagery, according to an exemplary embodiment of the present invention, includes: obtaining a second video image including pixels associated with features of the guidewire; and setting an open curve position in the second video image. In an exemplary embodiment of the present invention, the open curve aligned on the first video image is positioned on the second video image. For example, as described above, the peak of the cross-correlation may give the displacement of the open curve on the second video image. After the open curve is positioned on the second video image, the step 130 of determining a feature map and the step 140 of updating the parameters of the open curve may be performed. This sequence of steps may be repeated a multiple number of times or until all of the video frames are processed.

It is to be understood that exemplary embodiments of the present invention may be implemented in various forms of hardware, software, firmware, special purpose processors, or a combination thereof. For example, exemplary embodiments of the present invention may be implemented in software as an application program tangibly embodied on a program storage device. The application program may be uploaded to, and executed by, a machine comprising any suitable architecture.

Figure 2:
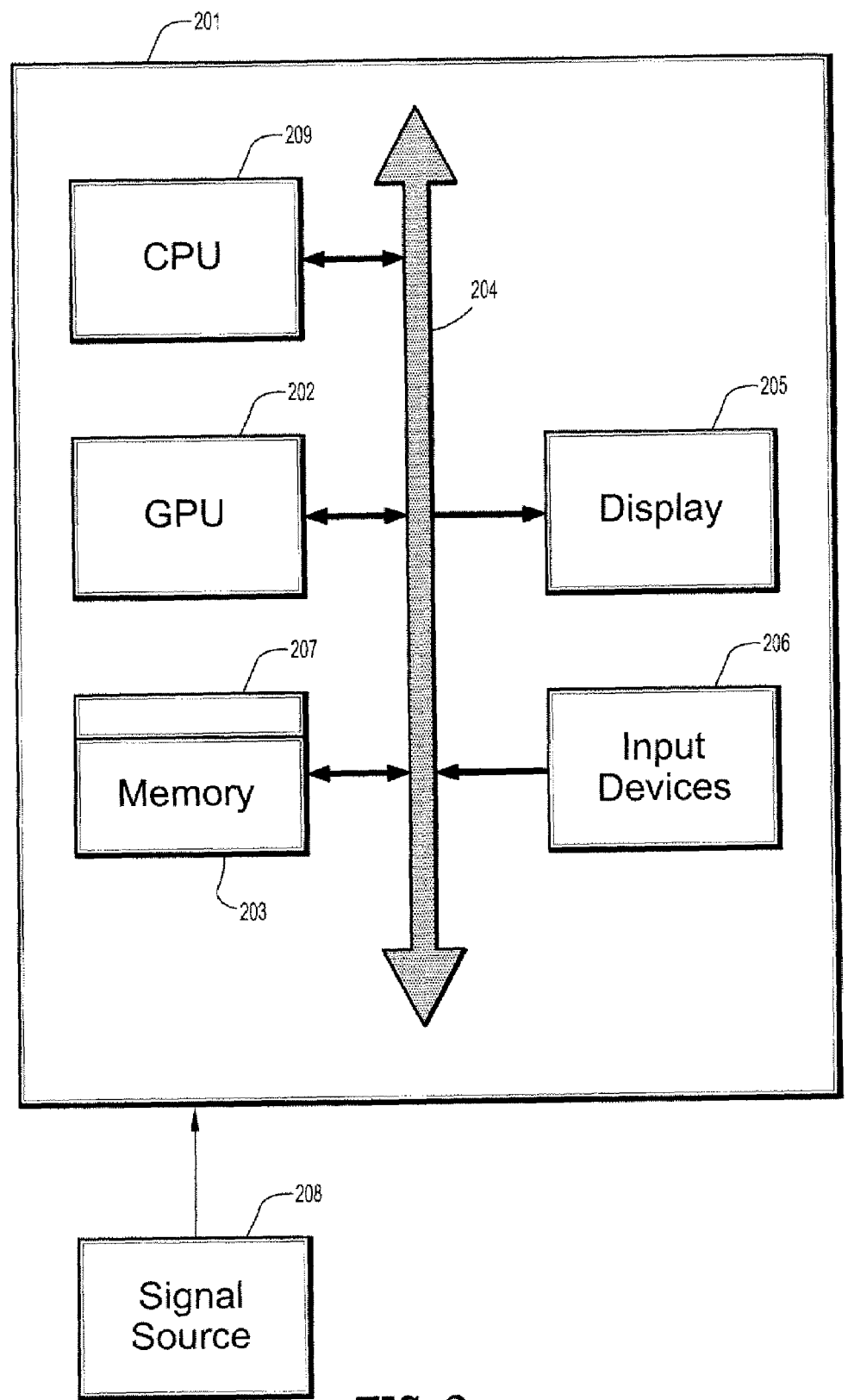
FIG. 2 illustrates a computer system for implementing a method of tracking a guidewire in video imagery, according to an exemplary embodiment of the present invention.

Referring to FIG. 2, according to an exemplary embodiment of the present disclosure, a computer system 201 for implementing a method of tracking a guidewire in video imagery can comprise, inter alia, a central processing unit (CPU) 209, a memory 203 and an input/output (I/O) interface 204. The computer system 201 may include a graphics processing unit (GPU) 202. The computer system 201 is generally coupled through the I/O interface 204 to a display 205 and various input devices 206 such as a mouse and keyboard. The support circuits can include circuits such as cache, power supplies, clock circuits, and a communications bus. The memory 203 can include random access memory (RAM), read only memory (ROM), disk drive, tape drive, etc., or a combination thereof. An exemplary embodiment of the present invention can be implemented as a routine 207 that is stored in memory 203 and executed by the CPU 209 to process the signal from the signal source 208. As such, the computer system 201 is a general purpose computer system that becomes a specific purpose computer system when executing the routine 207 of the present invention.

The computer platform 201 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

In an exemplary embodiment of the present invention, a system for tracking a guidewire in video imagery comprises a memory device 203 for storing a program, and a processor 209 in communication with the memory device 203. The processor 209 is operative with the program to: obtain a first video image including pixels associated with features of a guidewire; select a set of parameters to define an open curve on the first video image; determine a feature map of the first video image using phase congruency; and update the parameters of the open curve using the feature map to align the open curve to the pixels associated with the features of the guidewire.

It is to be further understood that, because some of the constituent system components and method steps depicted in the accompanying figures may be implemented in software, the actual connections between the system components (or the process steps) may differ depending upon the manner in which the present invention is programmed. Given the teachings of exemplary embodiments of the present invention provided herein, one of ordinary skill in the related art will be able to contemplate these and similar implementations or configurations of the present invention.

Figure 3:
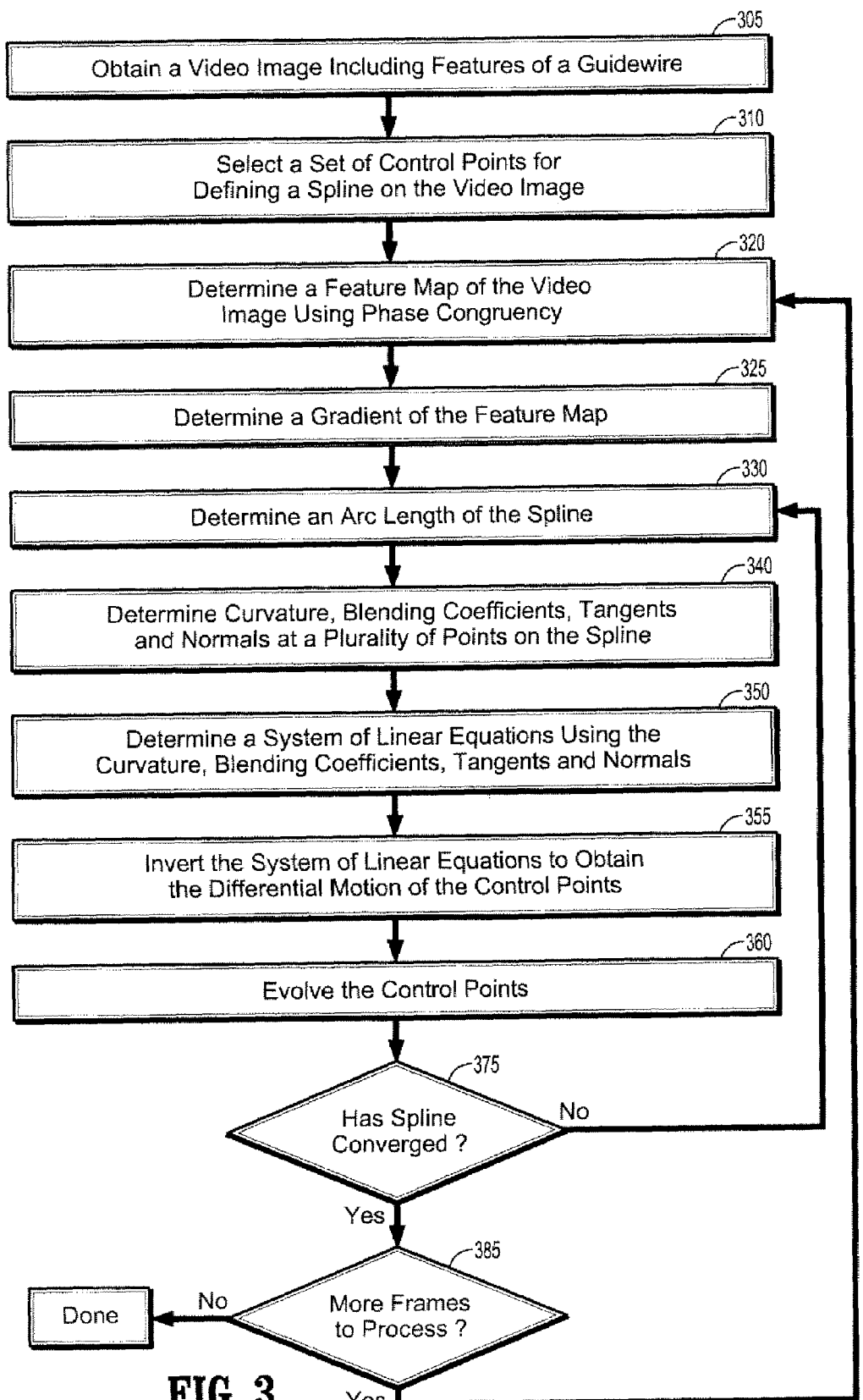
FIG. 3 is a flowchart showing a method of tracking a guidewire in video imagery, according to an exemplary embodiment of the present invention.

FIG. 3 is a flowchart showing a method of tracking a guidewire in video imagery, according to an exemplary embodiment of the present invention. The video imagery may be X-ray video imagery. Referring to FIG. 3, in step 305, obtain a first video image including pixels associated with features of a guidewire.

In step 310, select a set of control points for defining a spline on the first video image. For example, the spline may be a uniform rational B-spline. Exemplary embodiments of the present invention may be embodied using various splines, polyline, fourier descriptor curves, or implicit curves to model the curve. The set of control points may be selected manually, for example, based on proximity to the guidewire. The set of control points may be selected automatically.

In step 320, determine a feature map of the first video image using phase congruency. Determining a feature map of the first video image using phase congruency may include multi-scale image analysis.

In step 325, determine a gradient of the feature map. When applied to a digital image, this can be accomplished using discrete difference operators.

In step 330, determine an arc length of the spline. This can be computed by summing the length of each segment in a sampled version of the spline, or by integrating the magnitude of the first derivative of the spline.

Determine curvature, blending coefficients, tangents and normals at a plurality of points on the spline, in step 340. The curvature, tangents, and normals can be computed from the first and second derivatives of the spline. In an exemplary embodiment of the present invention, the blending coefficients are determined from Equation 13.

In step 350, determine a system of linear equations using the curvature, blending coefficients, tangents and normals. In step 350, invert the system of linear equations to obtain the differential motion of the control points. For example, this can be represented by Equation 17.

In step 360, evolve the control points until convergence. In an exemplary embodiment of the present invention, evolving the control points until convergence provides a solution to Equation 17.

In step 375, determine whether the spline has converged. For example, convergence refers to the point at which the energy E(C) in Equation 2 reaches a local minimum. When convergence has occurred, and when there is a next video frame to process, a cross-correlation of feature maps may be determined to find displacement of the spline. For example, this may be achieved by forming a bounding box around the spline on the current frame. The pixels of the current frame in the bounding box form a sub-image that is cross-correlated with the next frame.

In an exemplary embodiment of the present invention, the peak of the cross-correlation gives the displacement of the spline on the next video frame. It is to be understood that the next video frame may be the second video image, third video image, fourth video image, or other video image. In the case when convergence has not occurred, return to step 330, as shown in FIG. 3.

When convergence has occurred, determine whether there are additional frames to process, in step 385. In the case when there are additional frames to process, such as for example, a second video image, return to step 320, and determine a feature map of the second video image using phase congruency. Repeat steps 325 through 360 and, in step 375, determine whether convergence has occurred on the second video image. In the case when convergence has occurred, determine whether there are additional frames to process, in step 385.

Although exemplary embodiments of the present invention have been described in detail with reference to the accompanying drawings for the purpose of illustration, it is to be understood that the inventive processes and apparatus are not to be construed as limited thereby. It will be readily apparent to one of ordinary skill in the art that various modifications to the foregoing exemplary embodiments can be made without departing from the scope of the invention as defined by the appended claims, with equivalents of the claims to be included therein.

What is claimed is:

1. A method of tracking a guidewire in video imagery, comprising:
   obtaining a first video image including pixels associated with features of a guidewire;
   selecting a set of parameters to define an open curve on the first video image;
   determining a feature map of the first video image using phase congruency; and
   updating the parameters of the open curve using the feature map to align the open curve to the pixels associated with the features of the guidewire.

2. The method of claim 1, wherein the open curve is represented by a uniform rational B-spline.

3. The method of claim 2, wherein the parameters defining the open curve are control points that are interpolated by the uniform rational B-spline.

4. The method of claim 1, wherein determining a feature map of the first video image using phase congruency comprises multi-scale image analysis.

5. The method of claim 1, wherein when aligning the open curve to the pixels associated with the features of the guidewire, a predetermined length of the open curve is preserved.

6. The method of claim 1, wherein updating the parameters defining the open curve comprises using a gradient descent process that minimizes an energy functional defined on the open curve.

7. The method of claim 6, further comprising using one of tangential forces or a pseudo-inverse to update the parameters defining the open curve.

8. The method of claim 1, further comprising determining when convergence has occurred based on a local minimum of an energy.

9. The method of claim 8, further comprising, when it is determined that convergence has occurred, and when there is a second video image to process, determining a cross-correlation of feature maps to find displacement of the open curve.

10. The method of claim 9, further comprising setting an open curve position in the second video image.

11. A system for tracking a guidewire in video imagery, comprising:
   a memory device for storing a program;
   a processor in communication with the memory device, the processor operative with the program to:
   obtain a first video image including pixels associated with features of a guidewire;
   select a set of parameters to define an open curve on the first video image;
   determine a feature map of the first video image using phase congruency; and
   update the parameters of the open curve using the feature map to align the open curve to the pixels associated with the features of the guidewire.

12. The system of claim 11, wherein when determining a feature map of the first video image using phase congruency, the processor is further operative with the program to perform multi-scale image analysis.

13. The system of claim 11, wherein updating the parameters defining the open curve comprises energy minimization.

14. The method of claim 11, wherein updating the parameters defining the open curve comprises using a gradient descent process that minimizes an energy functional defined on the open curve.

15. A method of tracking a guidewire in video imagery, comprising:
   obtaining a first video image including features of a guidewire;
   selecting a set of control points for defining a spline on the first video image;
   determining a feature map of the first video image using phase congruency;
   determining a gradient of the feature map;
   determining an arc length of the spline;
   determining curvature, blending coefficients, tangents and normals at a plurality of points on the spline;
   determining a system of linear equations using the curvature, blending coefficients, tangents and normals;
   inverting the system of linear equations to obtain the differential motion of the control points; and
   evolving the control points.

16. The method of claim 15, wherein the gradient of the feature map is computed using central differences.

17. The method of claim 15, wherein the arc length of the spline is computed based on a derivative of the spline.

18. The method of claim 15, further comprising determining when convergence has occurred based on a local minimum of an energy.

19. The method of claim 18, wherein when it is determined that convergence has occurred, and when there is a second video image to process, computing a cross-correlation of feature maps to find displacement of the spline.

20. The method of claim 19, further comprising setting a spline position in the second video image using the displacement.

* * * * *